United States Patent
Mori et al.

(10) Patent No.: US 8,868,293 B2
(45) Date of Patent: Oct. 21, 2014

(54) INFORMATION DISPLAY SYSTEM

(71) Applicant: Denso Corporation, Kariya (JP)

(72) Inventors: Takuya Mori, Anjo (JP); Toshifumi Mori, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/069,657

(22) Filed: Nov. 1, 2013

(65) Prior Publication Data

US 2014/0129092 A1 May 8, 2014

(30) Foreign Application Priority Data

Nov. 5, 2012 (JP) ................................. 2012-243526

(51) Int. Cl.
*G06F 7/00* (2006.01)
*B60K 37/06* (2006.01)

(52) U.S. Cl.
CPC ....................................... *B60K 37/06* (2013.01)
USPC .......................................................... 701/36

(58) Field of Classification Search
USPC ......................................... 701/1, 36, 49, 538
See application file for complete search history.

(56) References Cited

U.S. PATENT DOCUMENTS

2012/0326958 A1* 12/2012 Deuel et al. ................... 345/156
2013/0038712 A1* 2/2013 Valaix ............................. 348/77

FOREIGN PATENT DOCUMENTS

| JP | 2009-255760 | 11/2009 |
| JP | 2010-018201 | 1/2010 |
| JP | 2010-047217 | 3/2010 |
| JP | 2012-076735 | 4/2012 |

* cited by examiner

*Primary Examiner* — Kim T Nguyen

(74) *Attorney, Agent, or Firm* — Harness, Dickey & Pierce, PLC

(57) ABSTRACT

An information display system for a vehicle is provided. In the information display system, a display device changes a position of a display screen by retracting a portion of a display screen from a visible space to an in invisible space and deploying the retracted portion of the display screen from the invisible space to the visible space. In accordance with the position of the display screen in the display device, a display controller changes information displayed on an effective display region of the display screen. The effective display region of the display screen is a region disposed in the visible space.

13 Claims, 12 Drawing Sheets

INFORMATION DISPLAY SYSTEM

CROSS REFERENCE TO RELATED APPLICATION

The present application is based on and claims priority to Japanese Patent Applications No. 2012-243526 filed on Nov. 5, 2012, disclosure of which is incorporated herein by reference.

TECHNICAL FIELD

The present disclosure relates to an information display system mounted to a vehicle.

BACKGROUND

A known information display system mounted to a vehicle reproduces video contents stored in a DVD or the like, so that a vehicle occupant can watch the video contents. When detecting start of the vehicle, an information display system stops a monitor from outputting the video contents and thereby restricts the vehicle occupant from watching the video contents.

In some cases, when the monitor is in a standing position during the traveling of the vehicle, the monitor hinders a driver's vision or distracts the driver's attention. For addressing this, when the vehicle is traveling, a system makes a display surface of the monitor invisible to the vehicle occupant by changing a monitor state from a standing state on a dashboard to a laid state or a retracted state (see Patent Document 1)

Patent Document 1: JP-2012-76735A

An information display system in which the monitor is not retracted involves a possibility that the monitor distracts the driver's attention by hindering a driver's vision or attracting the driver's attention.

However, when the monitor as a whole is retracted or laid during the vehicle traveling in order to avoid the above disadvantage to safety traveling, information unaffecting safety traveling cannot be provided to the vehicle occupant via the monitor

SUMMARY

The present disclosure is made in view of the foregoing. It is an object of the present disclosure to provide a technology that, while reducing disadvantages relating to vehicle traveling safety, can provide various information to a vehicle occupant from a display device. The disadvantages relating to vehicle traveling safety are, for example, directing the driver's attention to a display screen of a monitor.

According to one example of embodiments, an information display system mounted in a vehicle comprises an actuator, a display device, a deploy controller and a display controller. The display device includes a display screen for displaying information directed to a vehicle occupant of the vehicle. By being driven by the actuator, the display device retracts a portion of the display screen from a visible space, which is visible to the vehicle occupant, to an in invisible space, which is invisible to the vehicle occupant. By being driven by the actuator, the display device deploys the retracted portion of the display screen from the invisible space to the visible space. The display device changes a position of the display screen by retracting and deploying the portion of the display screen. The deploy controller controls the position of the display screen by controlling the actuator. The display controller performs display control of the display device. In accordance with the position of the display screen in the display device, the display controller changes information displayed on an effective display region of the display screen. The effective display region of the display screen is a region disposed in the visible space.

According to another example of embodiments, an information display system for a vehicle comprises an actuator, a display device, a deploy controller and a display controller. The display device includes a single display screen for displaying information to a vehicle occupant of the vehicle. The actuator retracts a predetermined portion of the single display screen, so that (i) the predetermined portion of the single display screen is inside a dashboard of the vehicle and (ii) the other portion of the single display screen is outside the dashboard. The actuator deploys the predetermined portion of the single display screen to the outside of the dashboard, so that both of the predetermined portion and the other portion of the single display screen are outside the dashboard. The deploy controller controls the actuator to retract and deploy the predetermined portion of the single display screen. The display controller makes a deployment retraction determination of whether the predetermined portion of the single display screen is retracted or deployed. Based on a result of the deployment retraction determination, the display controller changes information displayed on an effective display region of the single display screen. The effective display region of the single display screen is defined as a region that is outside, the dashboard. An area of the effective display region when the predetermined portion of the single display screen is retracted is smaller than that when the predetermined portion of the single display screen is deployed.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Embodiments will be described with reference to the drawings.

Figure 1:
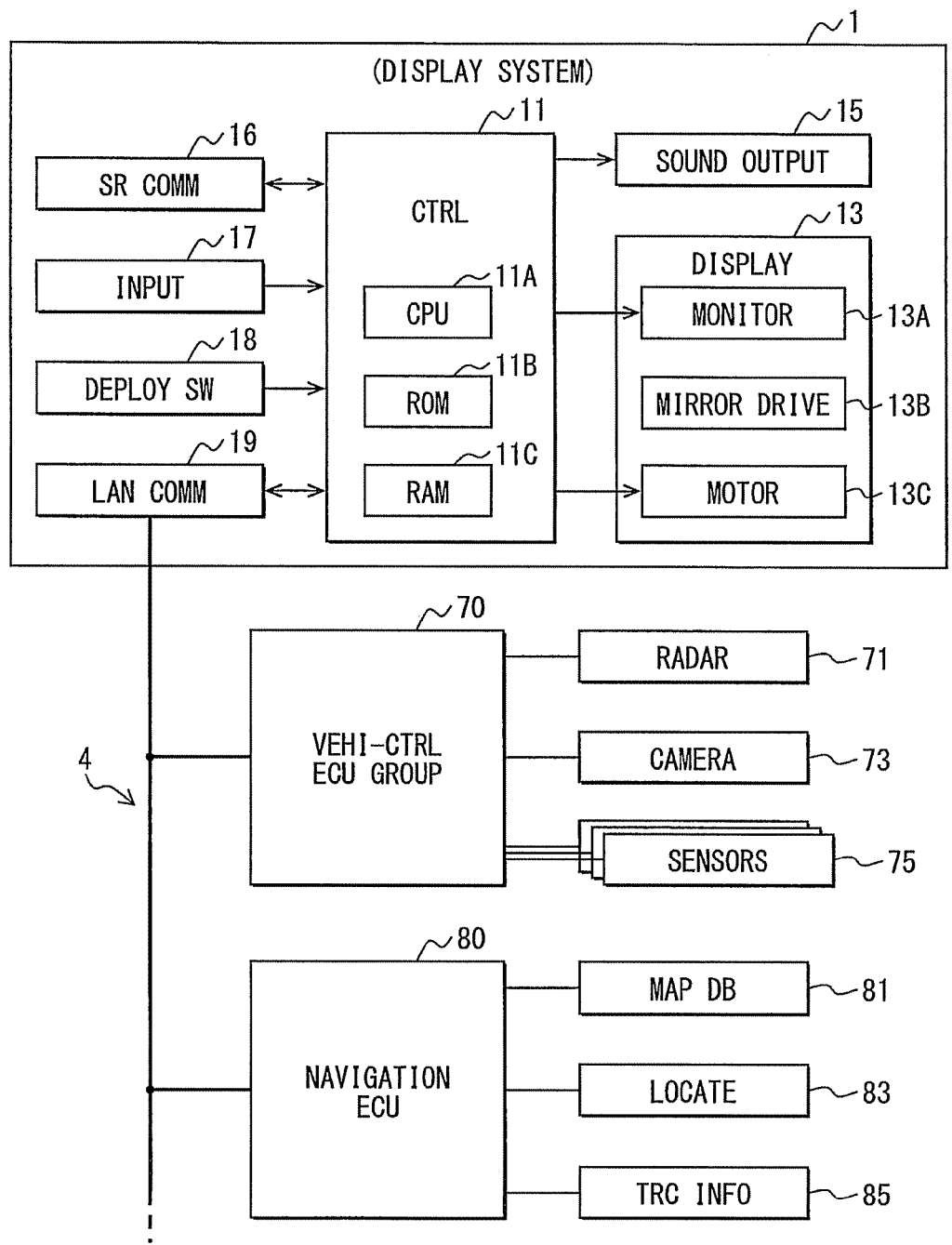
FIG. 1 is a block diagram illustrating a schematic configuration of a display system.

A display system 1 of the present embodiment illustrated in FIG. 1 is mounted to a vehicle such as s four-wheeled vehicle or the like, and displays various information to a vehicle occupant. This display system 1 includes a control device 11, a display device 13, a sound output device 15, a short range communication device 16, an input device 17, a deployment switch 18, and a LAN communication device 19.

The control device 11 performs an integrated control of components in the devices. The control device 11 includes a CPU 11A, a ROM 11B, and a RAM 11C. The ROM 11B stores various programs. The CPU 11A performs processing in accordance with various programs stored in the ROM 11B, thereby performing the integrated control of components in the devices. The RAM 11C is used as a working area at a time when the CPU 11A performs processing. The control device 11 may be configured as a microcomputer with a program specific to the present embodiment.

The display device 13 displays information directed to a vehicle occupant under control of the control device 11 (CPU 11A). The display device 13 includes a monitor 13A, a mirror drive mechanism 13B, and a motor 13C.

Figure 2:
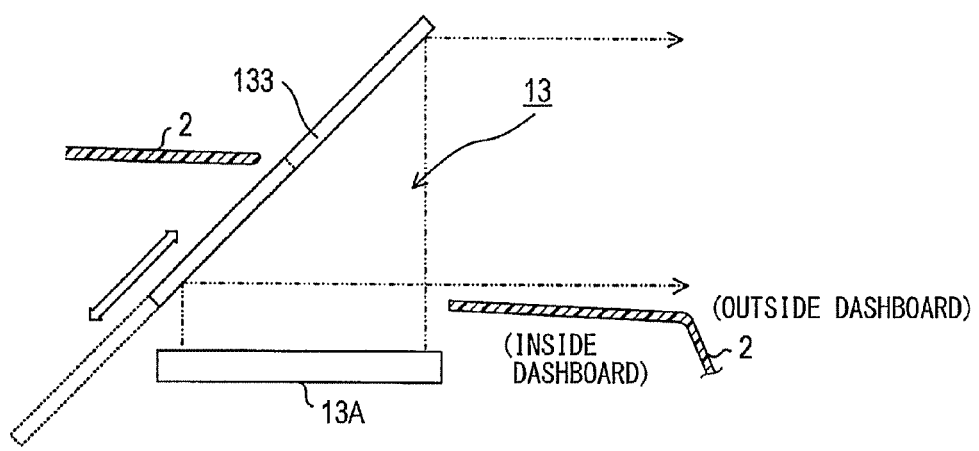
FIG. 2 is a side view illustrating a positional relationship between a mirror and a monitor.
Figure 3:
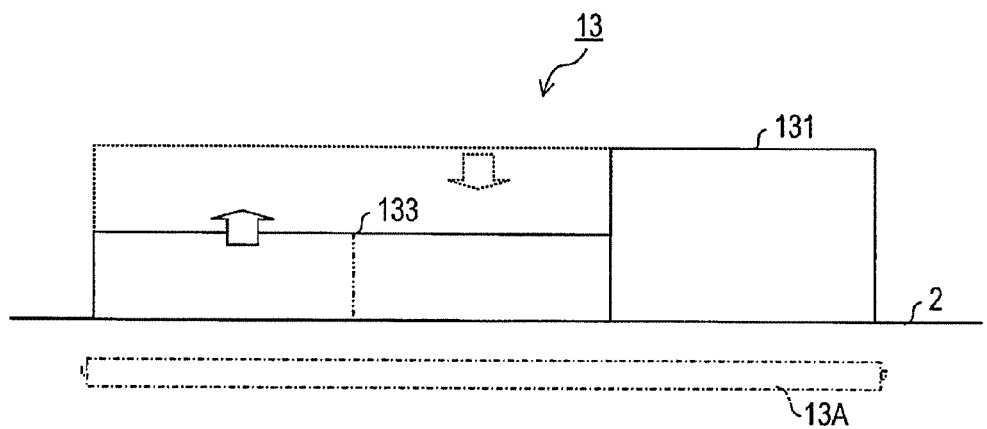
FIG. 3 is a front view illustrating a positional relationship between mirrors and a monitor.

The monitor 13A includes, for example, a liquid crystal display monitor for displaying an information screen (also called an information window). As shown in FIG. 2, the monitor 13A is arranged in a lying position in an inside of a dashboard 2. The dashboard 2 is in front of the deriver seat and the inside of the dashboard 2 is invisible to a vehicle occupant seated on the driver seat As shown in FIGS. 3 and 4, the mirror drive mechanism 13B includes a fixed mirror 131 and a movable mirror 133. The fixed mirror 131 and the movable mirror 133 act as mirrors for reflecting the information screen, which is displayed upward by the monitor 13A, to the front of the driver seat. In FIG. 3, the monitor 13A arranged inside the dashboard 2 and invisible from the outside of the dashboard 2 is illustrated by the one-dotted dashed line.

Figure 4A:
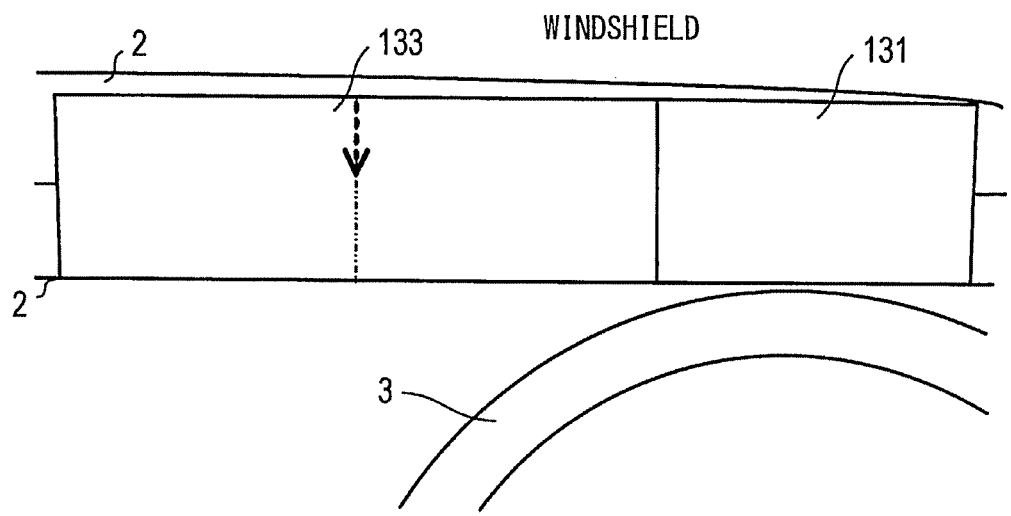
FIGS. 4A and 4B are diagrams illustrating positions of mirrors in a vehicle compartment from a driver's viewpoint.
Figure 4B:
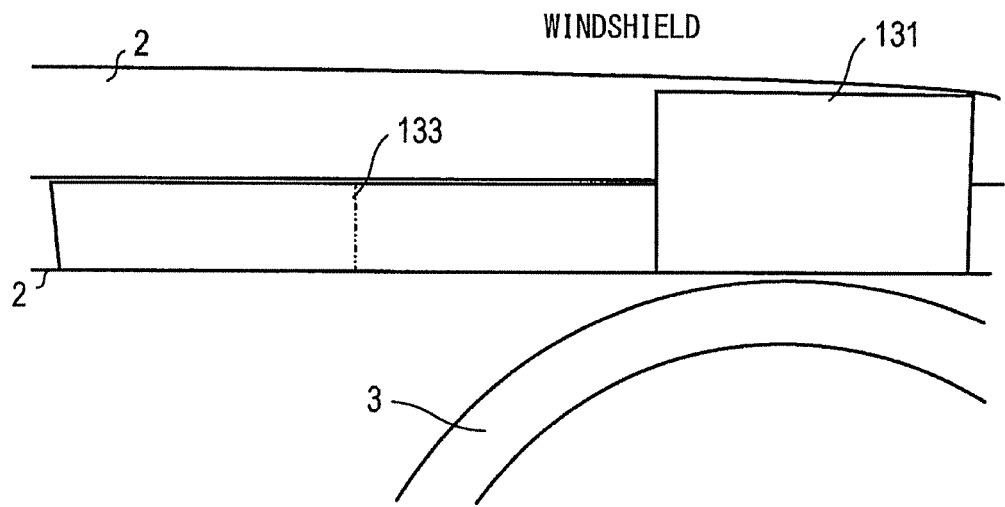

As shown in FIGS. 4A and 4B, the fixed mirror 131 is fixedly disposed at a place above the dashboard 2, so that a reflecting surface of the fixed mirror 131 is visible to the vehicle occupant (in particular a driver). Note that the place above the dashboard 2 is visible to the vehicle occupant. The movable mirror 133 is disposed, so that a reflecting surface of the movable mirror 133 is visible to the vehicle occupant (in particular a driver). The movable mirror 133 is not fixedly disposed. Specifically, by being driven by the motor 13C (see FIG. 1), the display device 13 can move the movable mirror 133, so that a lower region (i.e.; portion) of the movable mirror 133 is retracted in the dashboard and that the lower region of the movable mirror 133 is deployed from an inside of the dashboard 2 to a space above the dashboard 2. The deployment and retraction change an visible region of the reflecting surface of the movable mirror 133, wherein the visible region is a region visible to the vehicle occupant.

FIG. 4A illustrates a state where the movable mirror 133 including its lower region is disposed above the dashboard 2. FIG. 4B illustrates a state where the lower region of the movable mirror 133 is retracted in the dashboard 2 after the movable mirror 133 moves in a direction shown by the dashed arrow in FIG. 4A. According to the display device 13 of the present embodiment, the movable mirror 133 is retracted from and deployed to a driver's field of view between a steering wheel 3 and a lower portion of a windshield. In a state where the lower region of the movable mirror 133 is deployed from the inside of the dashboard 2 to the place above the dashboard 2, the movable mirror 133 is disposed at substantially the same height as the fixed mirror 131.

As shown in FIG. 2, these mirrors 131, 133 are disposed to have a predetermined angle (e.g., 45 degrees) with respect to the monitor 13A in a region onto which the information screen is projected. The mirrors 131, 133 reflect the information screen, which is displayed by the monitor 13A, to the front of the drive seat. The angle of the mirrors 131, 133 with respect to the monitor 13A may be adjusted with reference to a line of sight of the driver.

The two-dotted-dashed line in FIG. 2 schematically shows a trajectory of output light from the monitor 13A. The dashed line in FIG. 2 schematically shows a position of the movable mirror 133 when the lower region of the movable mirror 133 is retracted in the dashboard. In the present embodiment, the reflecting surface of the mirror 131,133 functions as a display surface for reflecting the information screen, which is displayed by the monitor 13A, to the vehicle occupant (in particular, the driver).

Now, components of the mirror drive mechanism 13B (see FIG. 1) other than the mirrors 131,133 will be described with reference to FIG. 5. These components constitute the power transmission mechanism, which converts the power from the motor 13C into the power for driving the movable mirror 133 upward and downward.

Figure 5:
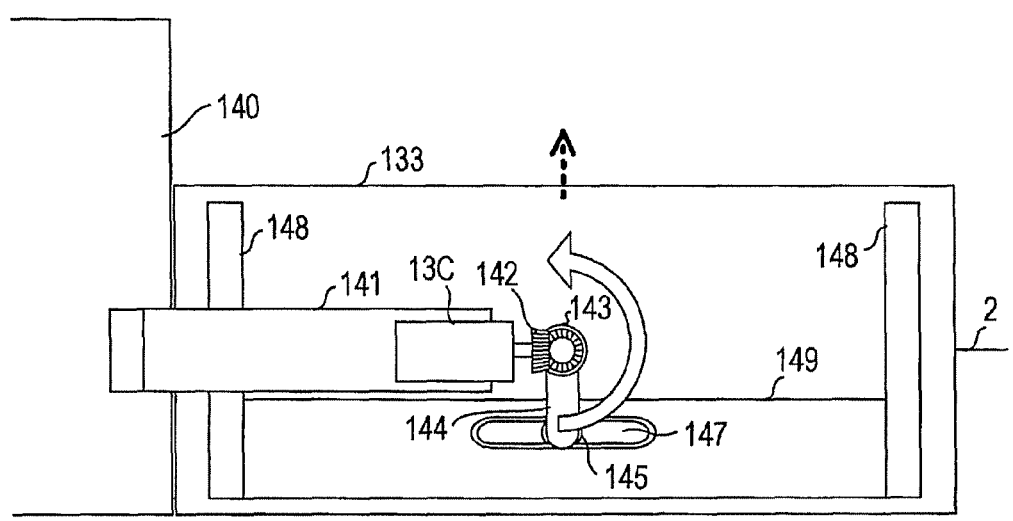
FIG. 5 is a diagram illustrating a configuration of a power transmission mechanism from a motor to a mirror.

As shown in FIG. 5, the motor 13C for driving the movable mirror 133 is fixed to a fixation member 141 on a rear side of the movable mirror 133. For example, the fixation member 141 is connected to a support member 140 supporting the rear surface of the mirror 131. Thereby the fixation member 141 supports the motor 13C.

A bevel gear 142 is attached to a rotation axis of the motor 13C. This bevel gear 142 engages with a bevel gear 143, which is perpendicular to the bevel gear 142. The bevel gear 143 is fixed to one end of an arm 144, and the arm 144 rotates together with the bevel gear 143 in a direction illustrated as the large arrow in FIG. 5. A bearing (not shown) rotatably holds the bevel gear 143 and the arm 144. The bearing is supported by the fixation member 141. The bearing is fixed and disposed to a connection portion between the bevel gear 143 and the arm 144.

A connection member 145 having a flange is fixed, through a hole 147, to an end of the arm 144 opposite to the bevel gear 143. The hole 147 has substantially an elliptical shape with its major axis in a left-to-right direction. A radius of the flange is larger than the minor radius of the hole 147. By the flange, the connection member 145 is fixed to the arm 144 so as not to depart from the hole 147. The hole 147 is formed in a metal plate 149, which is disposed between two metallic parts attached to the rear surface of the movable mirror 133.

The mirror drive mechanism 13B including the bevel gears 142, 143, the arm 144, the connection member 145 and the like constitutes the power transmission mechanism. Specifically, according to the mirror drive mechanism 13B, when the motor 13C rotates, this motive power rotates the arm 144 and the connection member 145 moves inside the hole 147 to push up the movable mirror 133 through the metal plate 147. In a state where the arm 144 is rotated by 180 degrees from a low position, the movable mirror 133 is pushed-up to a height of the fixed mirror 131, so that substantially all areas of the movable mirror 133 is disposed above the dashboard 2. When the motor 13C further rotates, the connection member 145 moves inside the hole 147 to push down the movable mirror 133 through the metal plate 149. In a state where the arm 144 is rotated to the low position, the lower region of the movable mirror 133 is disposed inside the dashboard 2. In these mechanisms, the movable mirror 133 is deployed and retracted.

The sound output device 15 (see FIG. 1) includes a speaker or the like, and outputs a warning sound, a guidance speech, an audio reproduction sound to a vehicle occupant in accordance with an input signal from the CPU 11A.

The short range communication device 16 communicates with a nearby communication terminal by Bluetooth (registered trademark) communication standards. An example of the communication terminal capable of performing short range communication includes a cellular phone such as a smart phone and the like.

The input device 17 includes various key switches, which can accept operations from the vehicle occupant. For example, the input device 17 is attached to a steering wheel 3 and accepts an operation from the driver (example of the vehicle occupant) and outputs an operation signal to the control device 11.

The deployment switch 18 can be operated by the vehicle occupant. The deployment switch 18 is used for the vehicle occupant to instruct the display system 1 to deploy the lower region of the movable mirror 133 from the inside of the dashboard to the space above the dashboard 2.

The LAN communication device 19 can perform two-way communications with various electronic control units (ECUs) connected to the in-vehicle LAN. Under control by the control device 11, the LAN communication device 19 communicates with various ECUs connected to the in-vehicle LAN. The in-vehicle LAN 4 is connected with a vehicle control related ECU group 70 and an information related ECU group including a navigation ECU 80 and the like.

The vehicle control related ECU group 70 includes a driving assist related ECU, in addition to well-known control related ECUs such as an ECU for engine control, an ECU for brake control and the like. According to one example, the driving assist ECU may detect an obstacle around the vehicle, a preceding vehicle, a side (left side or right side) vehicle, a lane, a road sign or the like by using the radar device 71 or the camera 73. In accordance with this detection result, the vehicle control related ECU group 70 can warn the vehicle occupant or perform vehicle control for danger avoidance. In this way, it is possible to assist the driver in driving the vehicle.

The vehicle control related ECU group 70 is connected with various sensors 75. The various sensors 75 include a shift position sensor for detecting a shift position, an accelerator position sensor for detecting a position of an accelerator, a steering sensor for detecting a steering angle, an on-off sensor for detecting an on and off of blinkers, a vehicle speed sensor for detecting vehicle speed, a raindrop sensor for raindrop detection, a light sensor for detecting brightness around the vehicle, and the like.

Specifically, the vehicle control related ECU group 70 performs vehicle control relating to vehicle traveling or warns the vehicle occupant in accordance with inputs from the various sensors 75, a result of radar wave (reflected wave) reception of the radar device 71, an image of vehicle surroundings captured by a camera 73, or the like.

The navigation ECU 80 is connected with a map database 81, a position detection device 83, a traffic information acquisition device 85 and the like. The navigation ECU 80 provides the vehicle occupant with route information and road information through the display system 1. The route information is information about a route to a destination point designated by the vehicle occupant. The road information is information about a road around the present position of the vehicle.

The map database 81 stores road information, such as information on road shape, a connection relations between roads, a presence or absence of a traffic signal at an intersection, a number of lanes, traffic regulations and the like. Under control by the navigation ECU 80, the map database 81 inputs this road information to the navigation ECU 80.

The position detection device 83 includes a Global Positioning System (GPS) receiver or the like. The position detection device 83 detects the present position of the vehicle and inputs a coordinate point of the present position to the navigation ECU 80. The traffic information acquisition device 85 may include, for example, a VICS (registered trademark: Vehicle Information and Communication System) receiver. The traffic information acquisition device 85 acquires traffic jam information, accident information or the like as time-variable road information from an information management center via a road side apparatus or the like and inputs the acquired information to the navigation ECU 80.

The navigation ECU 80 receives instructions from the control device 11 of the display system 1 via the in-vehicle LAN 4 and provides, the control device 11 with the route information and the road information according to the instructions. Additionally, the navigation ECU 80 generates a map image or a route guidance image according to the instructions, and provides it to the control device 11 via the in-vehicle LAN 4.

Based on information acquired from the vehicle control related ECU group 70, the navigation ECU 80 or the like, the control device 11 of the display system 1 performs display control of the monitor 13A in order for the monitor 13A to display information directed to the vehicle occupant, in particular, the driver.

Figure 6:
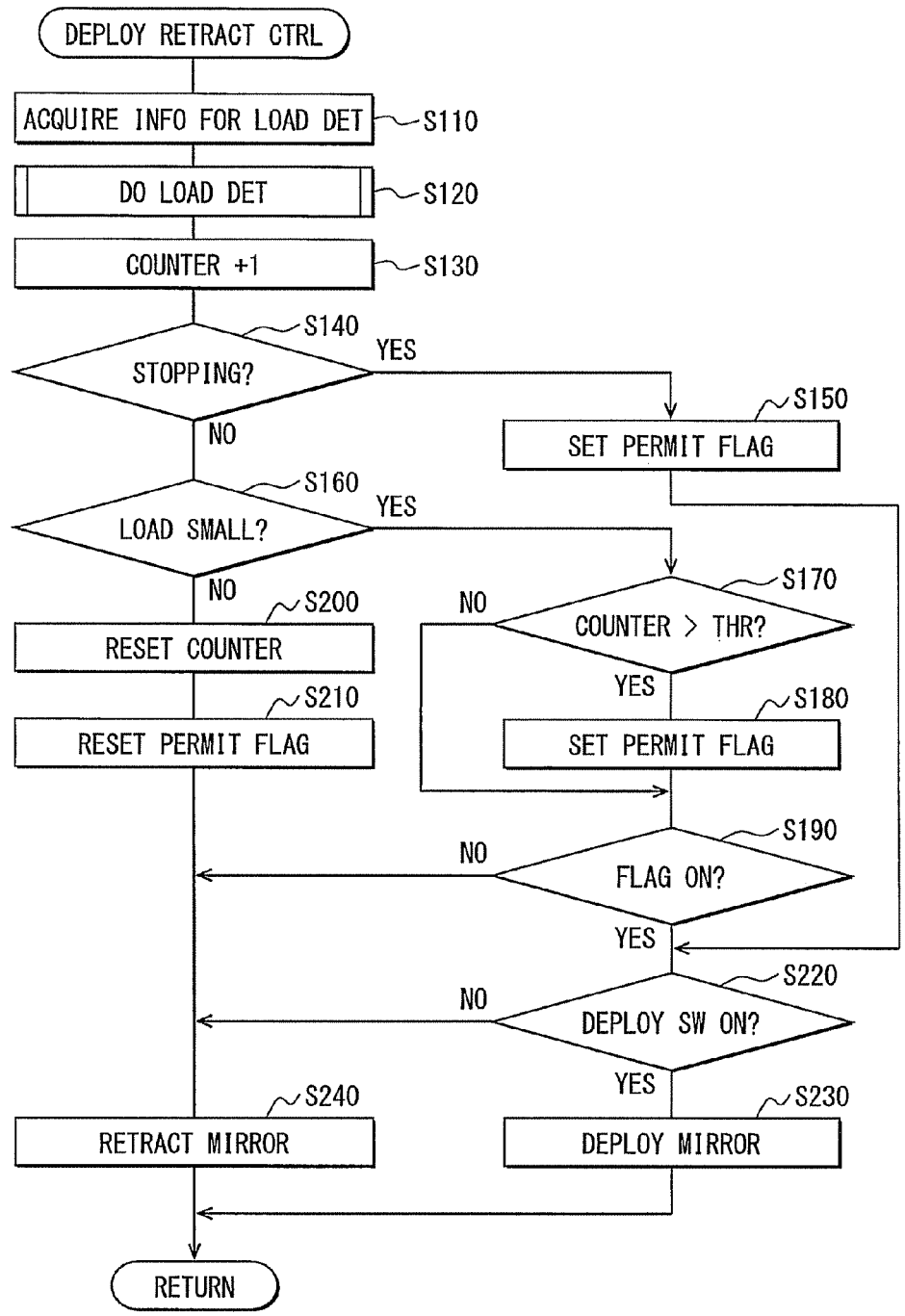
FIG. 6 is a flowchart illustrating a deployment retraction e control process performed by a control device.

The control device 11 (CPU 11A) performs a deployment retraction control process illustrated in FIG. 6. Thereby, the control device 11 performs motor control for deploying and retracting the movable mirror 133 in accordance with whether a driving load on the driver is large or small, whether the deployment switch is on or off, or the like.

Figure 7:
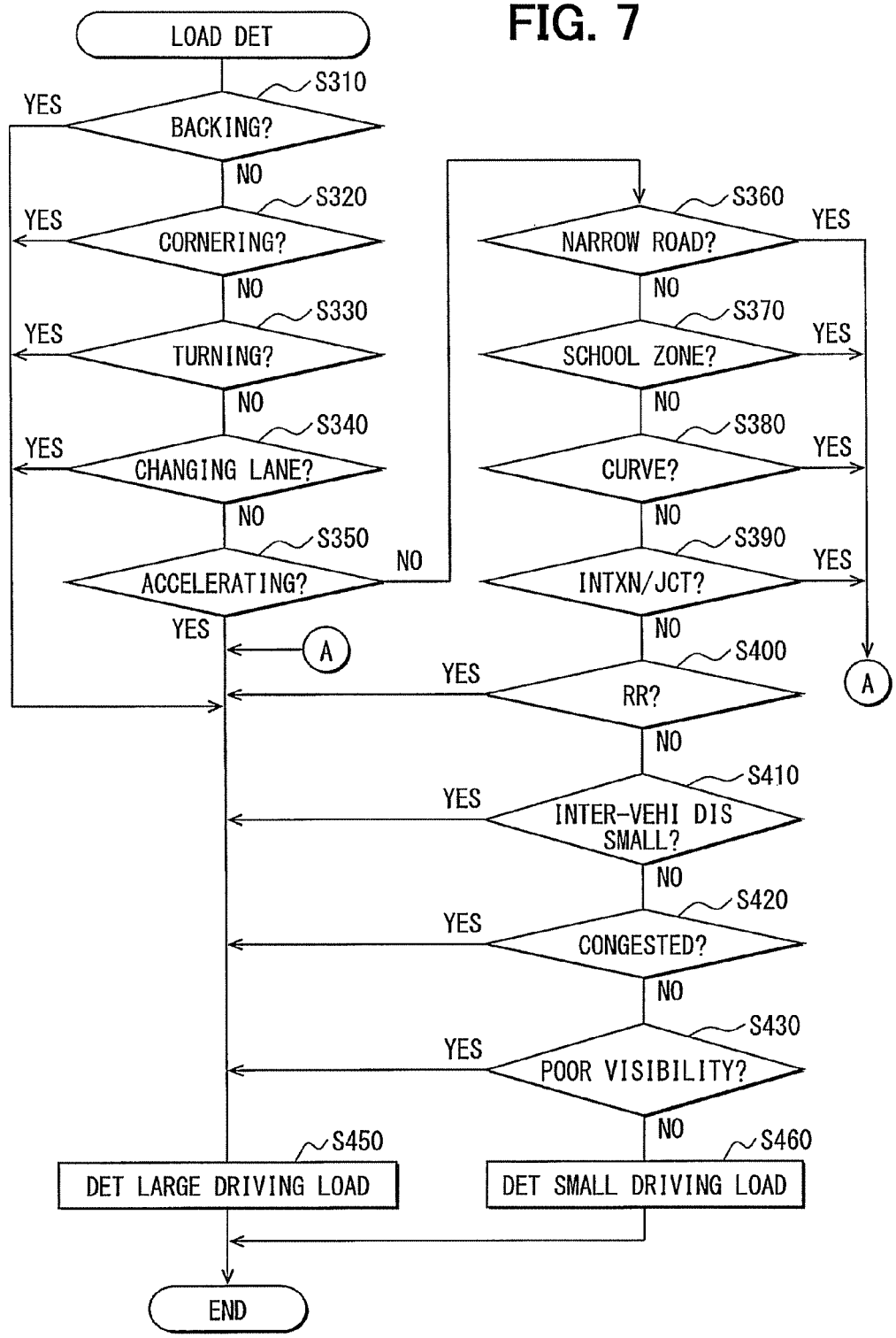
FIG. 7 is a flowchart illustrating a load determination process performed by a control device.

When the display system 1 is in operation, the control device 11 cyclically and repeatedly performs the deployment retraction control process. Upon staring the deployment retraction control process illustrated in FIG. 6, the control device 11 performs S110. At S110, the control device 11 acquires information needed to determine magnitude of the driving load on the driver, from the vehicle control related ECU group 70, the navigation ECU 80 or the like via the in-vehicle LAN 4. At S120, the control device 11 performs a load determination process illustrated in FIG. 7.

Upon starting the load determination process, the control device 11 determines whether or not the vehicle is backing (S310). For example, by acquiring the information on the shift position detected with the shift position sensors (one of various sensors 75), the control device 11 can make the determination S310.

Specifically, at S310, by determining whether the shift position is rear position (R) based on the acquired information, the control device 11 can determine whether the vehicle is backing. When it is determined that the vehicle is backing (YES at S310), it is determine (S450) that the driving load on the driver is large. In other words, it is determined (S450) that the driving load on the driver is larger than a threshold. In this case, the load determination process is ended.

When the vehicle is not backing (NO at S310), the control device 11 determines (S320) whether the vehicle is cornering. For example, by acquiring the information on the steering angle detected with the steering angle sensor (one of various sensors 75), the control device 11 can make the determination S320.

Specifically, at S320, by determining whether the steering angle is larger than a threshold based on this acquired information, the control device 11 can determine whether the vehicle is cornering. When it is determined that the vehicle is cornering (YES at S320), it is determined (S450) that the driving load on the driver is large. In other words, it is determined (S450) that the driving load on the driver is larger than a threshold. In this case, the load determination process is ended.

When the control device 11 determines that the vehicle is not cornering (NO at S320), the control device 11 determines (S330) whether or not the vehicle is making a turn (right/left turn). For example, by acquiring the information on a detection result of on and off of the blinker from the sensors 75, the control device 11 can make the determination S330. Specifically, at S330, by determining whether the blinker is on based on the acquired information, the control device 11 can determine whether the vehicle is making a turn.

When the control device 11 determines that the vehicle is making a turn (YES at S330), the control device 11 determines (S450) that the driving load is large. When the control device 11 determines that the vehicle is not making a turn (NO at S330), the control device 11 determines (S340) whether or not the vehicle is making a lane change. For example, by acquiring the information on a detection result of the lane change by the driving assist related ECU, the control device 11 can make the determination S340. When the control device 11 determines that the vehicle is making a lane change (YES at S340), the control device 11 determines (S450) that the driving load is large.

When the control device 11 determines that the vehicle is not making a lane change (NO at S340), the control device 11 determines whether or not the vehicle is accelerating or decelerating. For example, by acquiring the information on the vehicle speed detected with the vehicle speed sensor (one of various sensors 75), the control device 11 can make the determination S350. Specifically, at S350, by determining whether or not acceleration or deceleration specified by the acquired vehicle speed information is greater than or equal to a threshold, the control device 11 can determine whether or not the vehicle is accelerating or decelerating.

When the control device 11 determines that the vehicle is accelerating or decelerating (YES at S350), the control device 11 determines (S450) that the driving load is large. When the control device 11 determines that the vehicle is not accelerating nor decelerating (NO at S350), the control device 11 makes driving load determinations S360 to S400 based on type of the vehicle traveling road.

The vehicle traveling road, which is used as criterion of the driving load determinations, may include a road in a heading direction of the vehicle, in addition to a road on which the vehicle is traveling, because the vehicle is expected to travel the road in the heading direction of the vehicle. Before S360 to S400, the control device 11 acquires, for example, information indicating type of the vehicle traveling road from the navigation ECU 80. In accordance with instructions from the display system 1, the navigation ECU 80 provides the display system 1 with road information that enables identification of the type of the vehicle traveling road.

At S360, the control device 11 determines whether or not the vehicle traveling road is a small width road. For example, based on the information indicating the type of the traveling road, the control device 11 determines whether or not the width of the traveling road is less than or equal to a threshold. In this way, it is determined whether the vehicle traveling road is a small width road.

When the vehicle is traveling a cite not recognize as a road by the navigation ECU 80, it is highly likely that the driving load is large, as is the case where the vehicle is traveling a narrow road (small width road). Therefore, in this case, at S360, the control device 11 can make the above-described determination by deeming that the vehicle is traveling a narrow road.

When it is determined that the traveling road is a narrow road (YES at S360), the control device 11 determines that the driving load is large (S450). When it is determined that the traveling road is not a narrow road (NO at S360), the control device 11 determines whether or not the traveling road is in a school zone (S370). The determinations at S370, S380, S390 and S400 can be made based on the information indicating the type of the traveling road.

When it is determined that the traveling road is in a school zone (YES at S370), the control device 11 determines that the driving load is large (S450). When it is determined that the traveling road is not in a school zone (NO at S370), the control device 11 determines whether or not the vehicle traveling road is a curve (S380). When it is determined that the traveling road is a curve (YES at S380), the control device 11 determines that the driving load is large (S450).

When it is determined that the traveling road is not a curve (NO at S380), the control device 11 determines whether or not the vehicle traveling road is one of an intersection and a junction (S390). When it is determined that the traveling road is one of an intersection and a junction (YES at S390), the control device 11 determines that the driving load is large (S450).

When it is determined that the traveling road is neither an intersection nor a junction (NO at S390), the control device 11 determines whether or not the vehicle traveling road has a rail road crossing (S400). When it is determined that the vehicle traveling road has a rail road crossing (YES at S400), the control device 11 determines that the driving load is large (S450).

When it is determined that the vehicle traveling road does not have a railroad crossing (NO at S400), the control device 11 determines whether or not an inter-vehicle distance to a forward vehicle is small (S410). The control device 11 can make this determination based on, for example, information of the inter-vehicle distance to the forward vehicle detected with a radar device 71 or the like. This information may be acquired at S110. Specifically, the control device 11 determines whether or not the inter-vehicle distance to the forward vehicle indicated by the information acquired at S110 is smaller than a threshold. In this way, the control device 11 can determine whether or not the inter-vehicle distance to a forward vehicle is small. When it is determined that the inter-vehicle distance to a forward vehicle is small (YES at S410), the control device 11 determines that the driving load is large (S450).

When it is determined that the inter-vehicle distance to a forward vehicle is not small (NO at S410), the control device 11 determines whether or not the vehicle traveling road is congested (S420). The control device 11 can make this determination based on, for example, traffic information. The traffic information may be acquired by the navigation ECU 80 at S110 with use of the traffic information acquisition device 85.

When it is determined that the vehicle traveling road is congested (YES at S420), the control device 11 determines that the driving load is large (S450). When it is determined that the vehicle traveling road is not congested (NO at S420), the control device 11 determines whether or not a forward area of the vehicle is low visibility. For example, the control device 11 can make this determination based on a rain drop detection result of the raindrop sensor or a vehicle front brightness detection result of the light sensor. The raindrop sensor and the light sensor are included in various sensors 75. The rain drop detection result or the vehicle front brightness detection result may be acquired at S110. Specifically, when the raindrop is detected or when the brightness is smaller than a threshold and indicates nighttime, the control device 11 may determine the low visibility.

When the control device 11 determines that the forward area of the vehicle is low visibility (YES at S430), the control device 11 determines that the driving load is large (S450). When the control device 11 determines whether or not the forward area of the vehicle is not low visibility (NO at S430), the control device 11 determines that the driving load is small (S460).

When the determinations as to the driving load (S450, S60) are finished, the load determination process is ended.

When the load determination process is ended, the control device 11 proceeds to S130 (see FIG. 6) and updates a time count value X by increasing X by 1 (X←X+1). This time count value X is reset to zero at start of the first run of the deployment retraction control process after the start-up of the display system 1. It is noted that the deployment retraction control process is repeatedly performed after the start-up of the display system 1. It is also noted that the time count value X is not reset to zero every time the deployment retraction control process is performed.

After finishing S130, the control device 11 determines whether or not the vehicle is stopping (S140). The control device 11 can make this determination based on whether or not the shift position is a parking (P) position. The control device 11 may acquire the shift position based on a detection result of the shift position sensor. Alternatively, the control device 11 may determine whether or not the vehicle is stopping, based on whether or not the vehicle speed is zero. The control device 11 may acquire the vehicle speed based on a detection result of the vehicle speed sensor.

When the control device 11 determines that the vehicle is stopping (YES at S140), the control device 11 sets a deployment permission flag to value 1 (S150). The deployment permission flag is reset to zero at a start of the first run of the deployment retraction control process after the start-up of the display system 1. It is noted that the deployment retraction control process is repeatedly performed after the start-up of the display system 1.

After S150, the control device 11 proceeds to S220 and determines whether or not the deployment switch 18 is on. When it is determined that the deployment switch 18 is on (YES at S220), the control device 11 controls the motor 13C to deploy the lower region of the movable mirror 133 from the position inside the dashboard 2 to the position above the dashboard (S230). Thereafter, the deployment retraction control process is ended. In this regard, however, if the lower region of the movable mirror 133 has been already deployed to the position above the dashboard 2, the control device 11 keeps the present position of the movable mirror 133 (S230) without driving the motor 13C and ends the deployment retraction control process.

When it is determined that the deployment switch 18 is off (NO at S220), the control device 11 controls the motor 13C to retract the lower region of the movable mirror 133 from the position above the dashboard 2 to the position inside the dashboard 2 (S230). Thereafter, the deployment retraction control process is ended. In this regard, however, if the lower region of the movable mirror 133 has been already retracted in the dashboard 2, the control device 11 keeps the present position of the movable mirror 133 without driving the motor 13C (S230) and ends the deployment retraction control process.

When it is determined that the vehicle is not stopping (NO at S140), the control device 11 changes the subsequent process depending on the magnitude (large or small) of the driving load determined in the above-described load determination process.

Specifically, when it is determined that the driving load is small (YES at S160), the control device 11 determines whether or not the time count value exceeds a threshold (S170). The time count value is increased by one each time the deployment retraction control process is performed. When it is determined that the time count value exceeds the threshold (YES at S170), the deployment permission flag is set to value 1 (S180), and thereafter, the control device 11 proceeds to S190. When it is determined that the time count value is less than or equal to the threshold (NO at S170), the control device 11 proceeds to S190 without performing S180.

At S190, the control device 11 determines whether or not the deployment permission flag is set to value 1 at the present time. When it is determined that the deployment permission flag is set to value 1 (YES at S190), the control device 11 performs S220 and subsequent processes. Specifically, depending on/off of the deployment switch 18, the movable mirror 133 is deployed or retracted (S230, S240). When it is determined that the deployment permission flag is reset to value zero (NO at S190), the control device 11 performs the above-described S240. Thereafter, the deployment retraction control process is ended in a state where the lower region of the movable mirror 133 is retracted in the dashboard.

When it is determined in the load determination process that the driving load is large (NO at S160), the control device 11 resets the time count value to zero (S200) and resets the deployment permission flag to value zero (S210). Thereafter, the control device 11 performs S240. Thereafter, the deployment retraction control process is ended in a state where the lower region of the movable mirror 133 is retracted in the dashboard.

Specifically, according to the deployment retraction control process, when the vehicle is stopping, the movable mirror is deployed or retracted (S230, S240) depending on whether the deployment switch 18 is on or off. Additionally, even if the vehicle is not stopping, when the small driving load continues for a predetermined time period, the movable mirror 133 is deployed or retracted (S230, S240) depending on whether the deployment switch 18 is on or off. Additionally, when the vehicle is not stopping and the driving load is large, or, when a time period of the small driving load is less than or equal to the predetermined time period, the movable mirror 133 is retracted (S240) regardless of whether the deployment switch 18 is on or off.

An area of the effective display region of the reflecting surface of the movable mirror varies depending on the retraction or deployment of the lower region of the movable mirror 133 by the above retraction deployment control process. In the above, the effective display region of the reflecting surface is a region in a space that is above the dashboard and that is visible to the vehicle occupant (driver).

Figure 8:
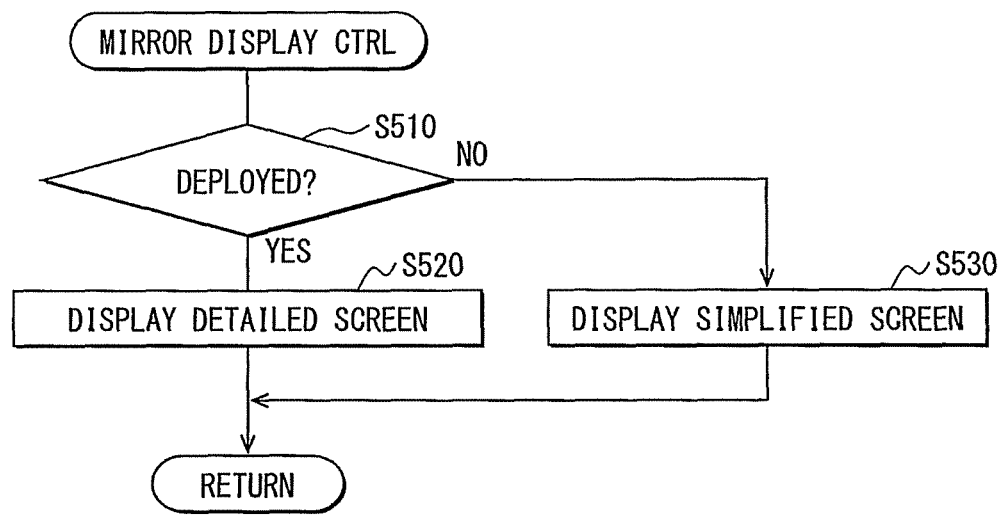
FIG. 8 is a flowchart illustrating a movable mirror display control process performed by a control device.

When the display system 1 is in operation, the control device 11 repeatedly performs the movable mirror display control process illustrated in FIG. 8. Thereby, the control device 11 changes a form of information screen displayed on the effective display region of the movable mirror 133.

Upon starting the movable mirror display control process, the control device 11 determines whether or not the lower region of the movable mirror 133 is deployed in the space above the dashboard 2 (S510). When it is determined that the lower region of the movable mirror 133 is deployed (YES at S510), the control device 11 performs the display control of the monitor 13A (S520) to display a predetermined detailed information screen as the display on the effective display region of the movable mirror 133. In the above, the predetermined detailed information screen has a predetermined configuration. When it is determined that the lower region of the movable mirror 133 is not deployed (NO at S510), the control device 11 performs the display control of the monitor 13A (S520) to display a simplified information screen on the effective area of the movable mirror 133. The simplified information screen corresponds to the detailed information screen (also called a non-simplified information screen).

Specifically, in a left-to-right direction, a width of the movable mirror 133 is two times as large as that of the fixed mirror 131 (see FIGS. 3 and 4). The movable mirror 133 has two sections (i.e., left section and right section), which are defined by dividing the movable mirror 133 into the two sections in the left-to-right direction. The control device 11 performs the display control of the monitor 13A to display different information screens on the two sections. The different information screens differ in kind. The two-dotted-dashed line in FIGS. 3 and 4 shows the boundary between the two sections. In the present embodiment, for example, the fixed mirror 131 displays the information screen including information especially important in the vehicle traveling (e.g., vehicle speed meter), and the movable mirror 133 displays two information displays including other information.

Now, configurations of the information screens, which are displayed on the sections of the movable mirror 133 by the display control of the control device 11, will be described with reference to FIGS. 9 to 13.

Figure 9:
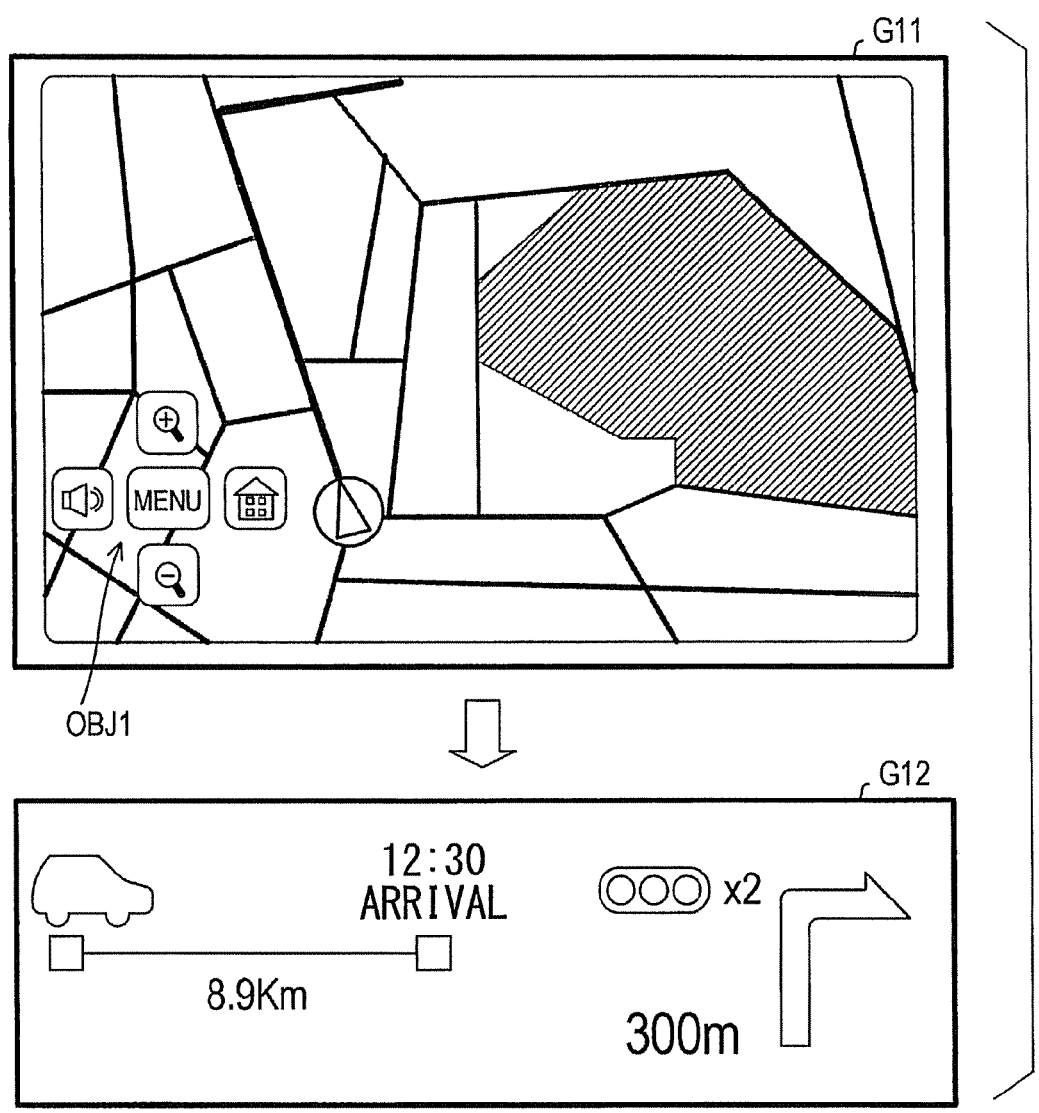
FIG. 9 is a diagram illustrating a detailed navigation screen and a simplified navigation screen.

One example of the information screens is a navigation screen illustrated in FIG. 9. An upper portion of FIG. 9 illustrates the detailed information screen G11 corresponding to the navigation screen. A lower portion of FIG. 9 illustrates a simplified navigation screen G12 as the simplified information screen.

As can been from FIG. 9, the detailed navigation screen G11 displays a map image around the present position of the vehicle. Additionally, the detailed navigation screen G11 displays an operation object (an operation target such as icon) OBJ1 manipulable with the input device 17. Additionally, a mark representing the present position and a graphic representing a route to a destination point (thick line shown in the upper portion of FIG. 9) are displayed on the map image. By the display control of the control device 11 (S520), the detailed navigation screen G11 is displayed on substantially an entire area of one section in the effective display region of the movable mirror 133.

By contrast, the simplified navigation screen G12 displays a path length from the present position to the destination point, an arrival time of the destination point, a road length to a next point for a right turn or left turn, and a turning direction at the next point for a right turn or left turn. In this manner, the map display around the present position, which is included in the detailed navigation screen G11, is omitted from the simplified navigation screen G12. By the display control of the control device 11 (S530), the simplified navigation screen G12 is displayed on substantially an entire area of one section in the effective display region of the movable mirror 133 whose lower region of the mirror 133 is retracted.

Figure 10:
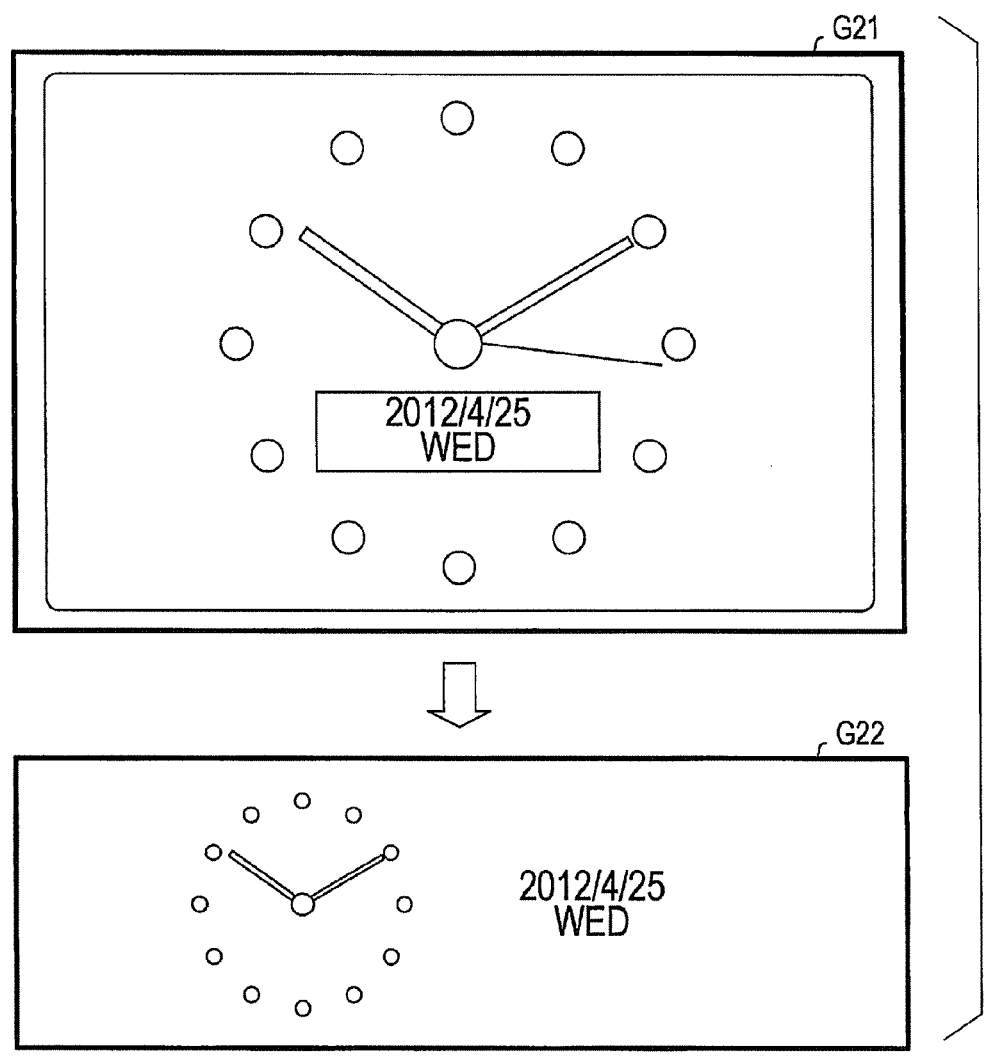
FIG. 10 is a diagram illustrating a detailed clock screen and a simplified clock screen.

Next, a clock screen illustrated in FIG. 10 will be explained as one example of the information screen. An upper portion of FIG. 10 illustrates a detailed clock screen G21 as the detained information screen corresponding to the clock screen. A lower portion of FIG. 10 illustrates a simplified clock screen G22 as the detailed information screen.

As can been seen from FIG. 10, the detailed clock screen G21 displays, at the center thereof, a graphic (an analog clock image) representing an analog clock. Specifically, the detailed clock screen G21 displays a present time with the hour hand, the minute hand and the second hand. Moreover, the detailed clock screen G21 displays the present date and day of the week as text information, so that the text information is inside the clock face arranged in a circumferential direction. By the display control (S520) of the control device 11, the detailed clock screen G21 is displayed on substantially an entire area of one section of the effective display region of the movable mirror 133. This is the case in the below-explained detailed meter screen G31, detailed phone information screen G41 and detailed SNS screen G51.

By contrast, the simplified clock screen G22 displays an analog clock image and text information of the date and day of the week in a layout different than the detailed clock screen G21. Specifically, the simplified clock screen G22 displays the analog clock image on a left side and the text information of the date and day of the week on a right side. The analog clock image displayed in the simplified clock screen G22 is smaller in size than the analog clock image displayed in the detailed clock screen.

More specifically, a simplified image not having the second hand is displayed as the analog time image on the simplified clock screen G22. By the display control (S530) of the control device 11, the simplified clock screen G22 is displayed on substantially an entire area of one section of the effective display region of the movable mirror whose lower region is retracted. This is the case in the below-explained simplified meter screen G32, simplified phone information screen G42, and simplified SNS screen G52.

Figure 11:
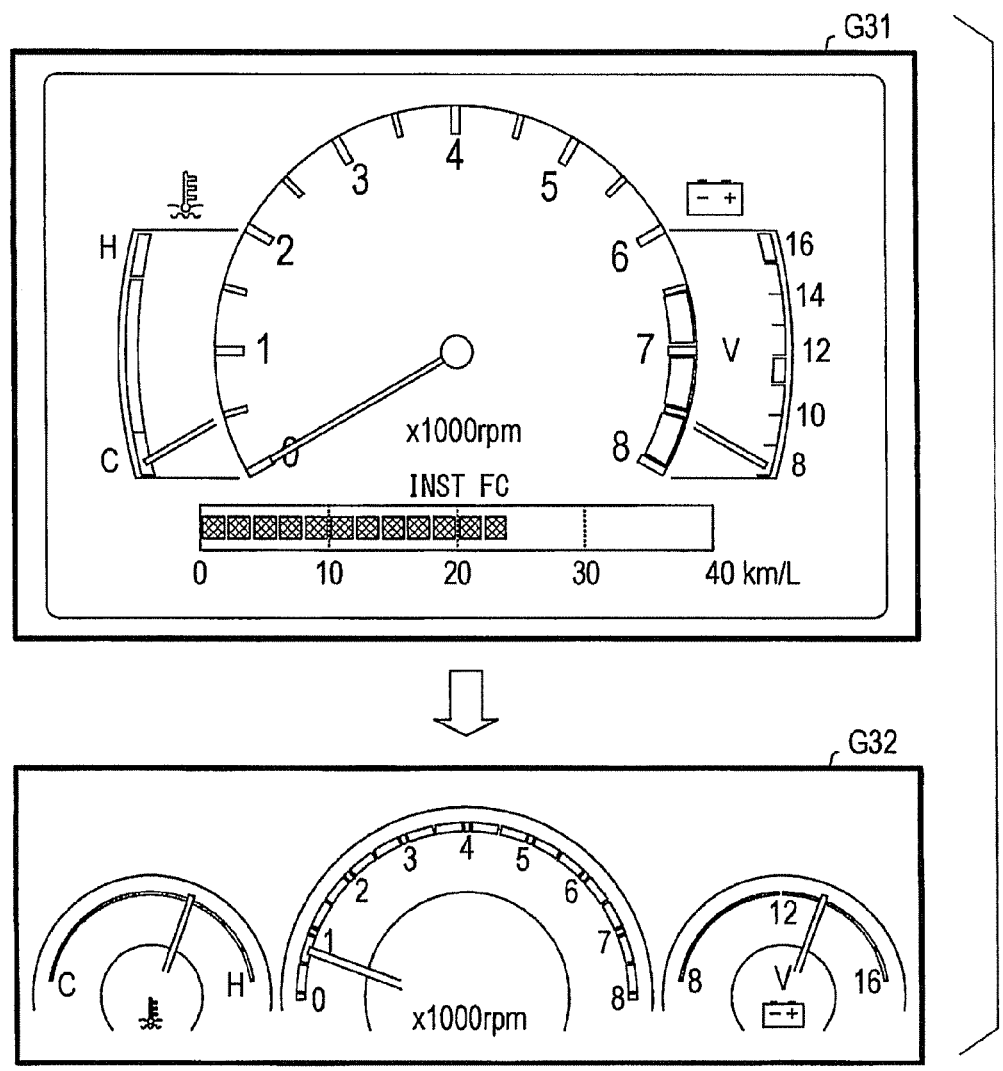
FIG. 11 is a diagram illustrating a detailed meter screen and a simplified meter screen.

Next, a configuration of the meter screen illustrated in FIG. 11 will be explained as one example of the information screen. An upper portion of FIG. 11 illustrates a configuration of detailed meter screen G31 as the detailed information screen corresponding to the meter screen. A lower portion of FIG. 11 illustrates a configuration of simplified meter screen G32 as the simplified information screen.

As can be seen from FIG. 11, the detailed meter screen G31 displays a tachometer, a coolant temperature gauge, a battery voltage meter, and an instantaneous fuel efficiency indicator. By contract, the simplified meter screen G32 displays the tachometer, the coolant temperature gauge, and the battery voltage meter by using graphics (illustration images) different than the detailed meter screen G31. Additionally, the instantaneous fuel efficiency indicator displayed on the detailed meter screen G31 is omitted from the simplified meter screen G32.

The simplified meter screen G32 has a smaller display area than the detailed meter screen G31. Additionally, the instantaneous fuel efficiency indicator is most unimportant in term of vehicle safety driving among the tachometer, the coolant temperature gauge, the battery voltage meter and the instantaneous fuel efficiency indicator. Therefore, the instantaneous fuel efficiency indicator is omitted from the simplified meter screen G32.

Next, the phone information screen illustrated in FIG. 12 will be explained as one example of the information screen. In the present embodiment, the display system 1 and a cellular phone terminal of the user is connected through the short range communication device 16. The phone information screen is provided to display information on the cellular phone terminal through the short range communication device 16. The upper region of FIG. 11 illustrates a configuration of detailed phone information screen G41 as the detailed information screen corresponding to the phone information screen. The upper region of FIG. 11 illustrates a simplified phone information screen G42 as the simplified information screen.

Figure 12:
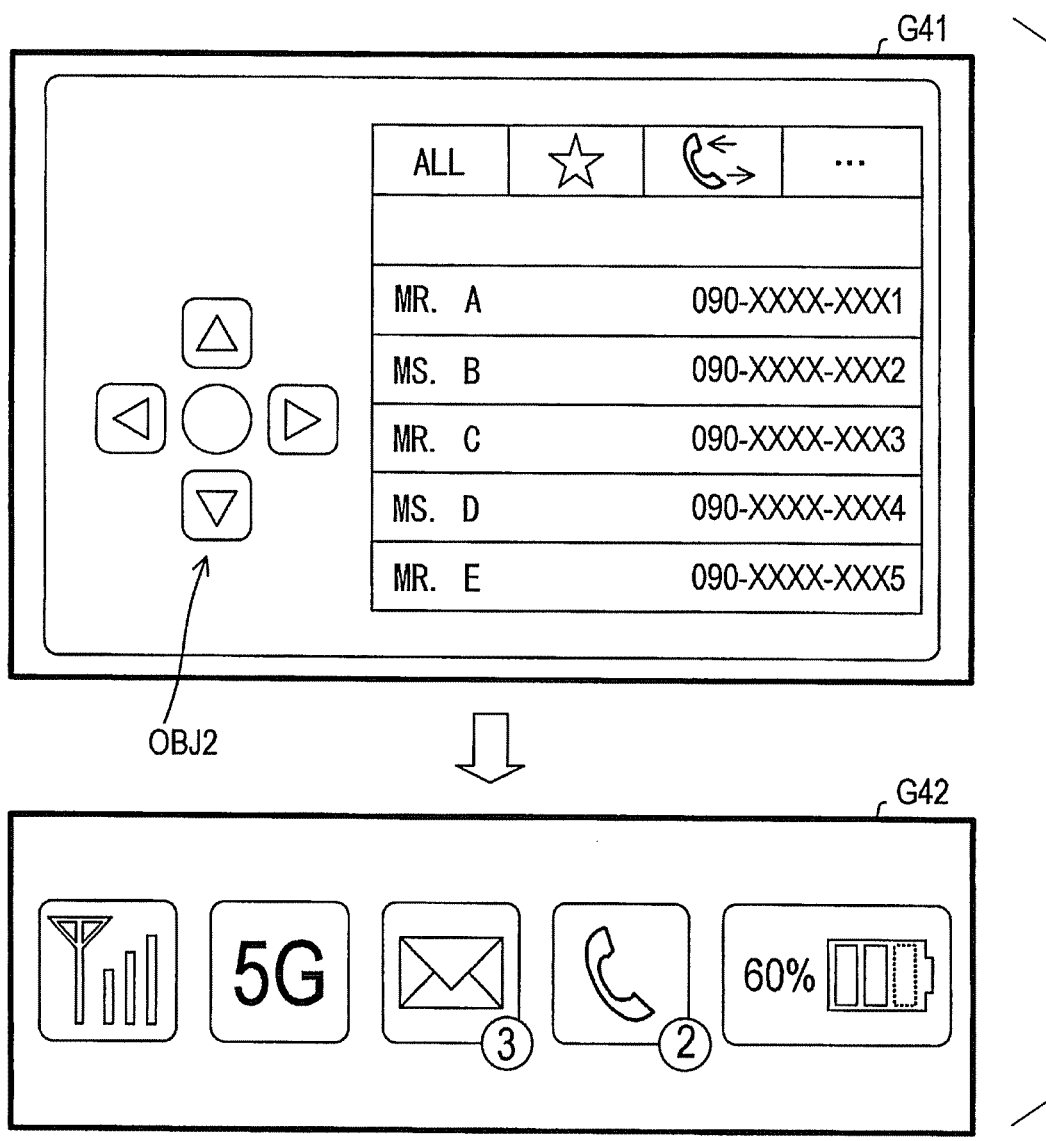
FIG. 12 is a diagram illustrating a detailed phone information screen and a simplified phone information screen.

As can been seen from FIG. 12, the detailed phone information screen G41 displays a tabbed window (tabbed document window) and an operation object OBJ2 for operating the tabbed window. The input device 17 inputs a tab switching operation in response to operating the operation object OBJ2. The tabbed window switches between a phone book for listing up telephone numbers of all registered users, a phone book for listing up telephone numbers of specific users, a history of incoming calls and outgoing calls, and other information on the cellular phone terminal (history of incoming mails or the like).

By contrast, the simplified phone information screen G42 displays reception sensitivity of the cellular phone terminal, the name of communication line, the number of incoming mails, the number of incoming calls, and a remaining battery level. In contrast to the detailed phone information screen G41 including the operation object OBJ2 manipulable by the user via the input device 17, the simplified phone information screen G42 does not include the operation object OBJ2 and merely provides an information display to the vehicle occupant.

Specifically, the simplified phone information screen G42 is configured as the information screen that is not manipulable with the input device 17. Note that if the screen manipulable by the user is displayed when the driving load is large, the driver becomes inattentive. However, according to the present embodiment, by switching between the detailed information screen and the simplified information screen, the display device 13 displays useful information directed to the vehicle occupant while ensuring the traveling safety.

Figure 13:
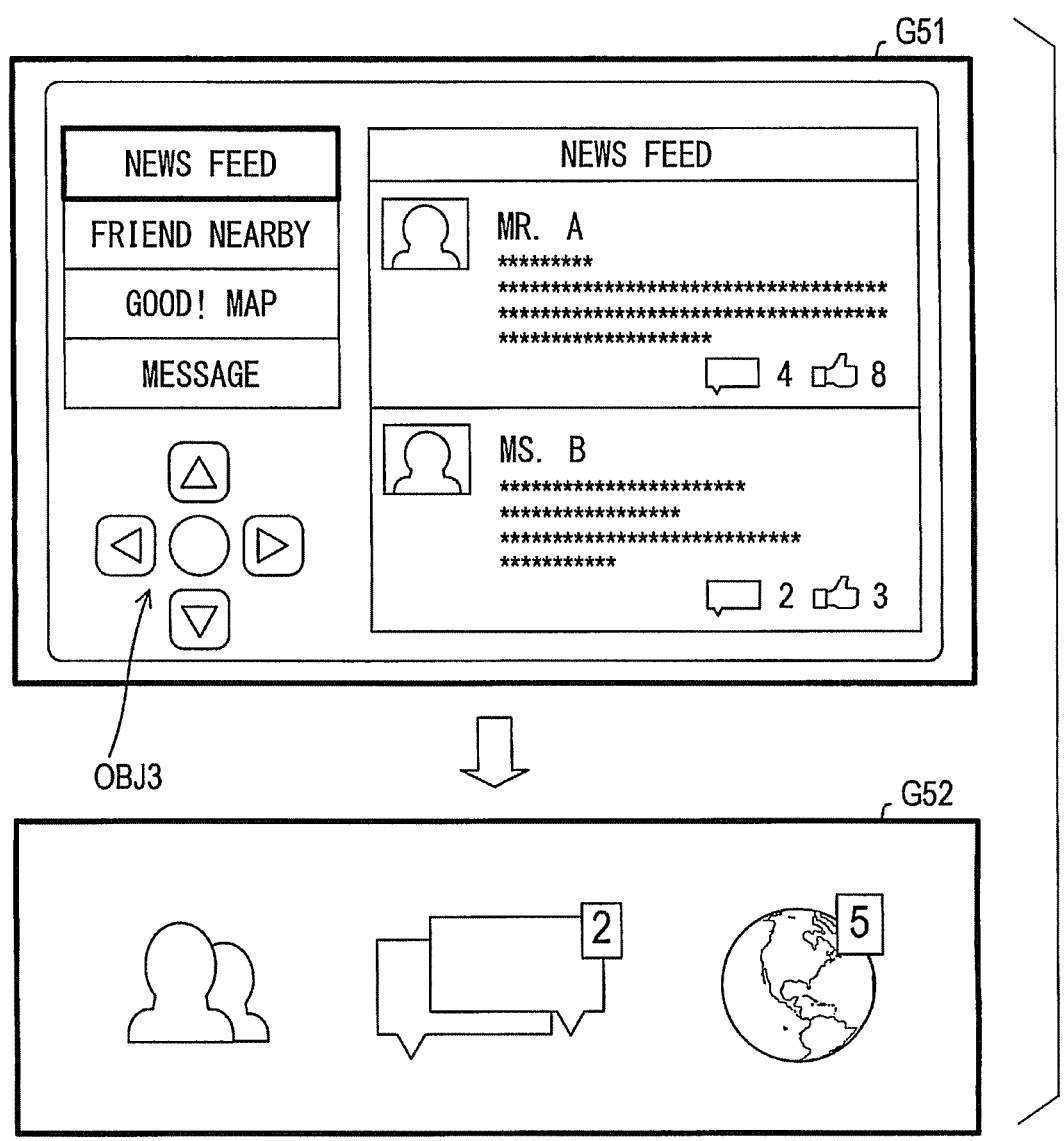
FIG. 13 is a diagram illustrating a detailed social network service (SNS) screen and a simplified SNS window.

Next, a configuration of the social network service (SNS) screen illustrated in FIG. 13 will be explained as one example of the information screen. The SNS screen is provided for the vehicle occupant to use the SNS. The upper portion of FIG. 13 illustrates the detailed SNS seen G51 as the detailed information screen corresponding to the SNS screen. The lower portion of FIG. 13 illustrates the simplified SNS screen G51 as the simplified information screen corresponding to the SNS screen.

As can be seen from FIG. 13, the detailed SNS screen G51 includes the operation object OBJ3, selection items manipulable with the operation object OBJ3, and a display region for displaying information corresponding to the selected item (contents of received message or the like). By contrast, the simplified SNS screen G52 displays the number of received messages, the number of notifications, and the like. Specifically, the detailed SNS screen G51 displays information such as contents of massage or the like which may requires the vehicle occupant to gaze to understand it. By contrast, the simplified SNS screen G52 displays simplified information such as the number of received messages or the like which is easily understandable by the vehicle occupant.

According to the display system 1 of the above illustrated embodiment, the display device 13 includes the monitor 13A and the mirrors 131, 133. The information screen displayed by the monitor 13A is reflected and displayed to the vehicle occupant, so that the vehicle occupant can visually recognize the information screen. By using the motor 13C as a driving source, the lower region of the movable mirror 133 is retracted from a visible space to an invisible space. Further, the retracted lower region of the movable mirror 133 is deployed from the invisible space to the visible space. The invisible space is a space that is invisible to the vehicle occupant and that is inside the dashboard. The visible space is a space that is visible to the vehicle occupant and that is a space outside the dashboard 2. By the retraction and the deployment, the position of the reflecting surface of the movable mirror 133 functioning as the display screen is changed.

Moreover, according to the display system 1, the control device 11 controls the motor 13C to control the position of the reflecting surface (deployment/retraction) and performs the display control of the monitor 13A. In accordance with the deployment and retraction of the reflecting surface, the control device 11 performs the display control to change the information displayed on the effective display region of the movable mirror 133, wherein the effective display region is a region above the dashboard 2.

Moreover, according to the display system 1 of the present embodiment, the load determination process determines whether the driving load on the driver is large or small. In accordance with a result of this determination, the lower region of the movable mirror 133 is retracted or deployed within a time period during which the vehicle is not stopping. Specifically, when it is determined that the driving load is large, the lower region of the movable mirror 133 is retracted to the inside of the dashboard. When it is determined that the driving load is small, the lower region of the movable mirror 133 is deployed to the space above the dashboard.

Accordingly, the display system 1 of the present embodiment can reduce disadvantages relating to the vehicle traveling safety and can provide useful information to the vehicle occupant via the effective display region. The disadvantages to be reduced are, for example, that the vehicle occupant becomes inattentive by watching the information screen of the display devise 13.

In particular, according to the present embodiment, the load determination process determines whether the driving load is large or small, base on the information representing the driving operation of the driver such as a shift lever operation, a steering operation, a blinker operation, a lane change operation, and acceleration/deceleration operation (S310 to S350). Furthermore, it is determined whether the driving load is large or small, based on the road information around the traveling road of the vehicle (S360 to S420). Furthermore, it is determined whether the driving load is large or small, based on visibility of front view of the driver (S430). Therefore, it is possible to appropriately make the determination as to the driving load.

Moreover, according to the present embodiment, when the vehicle is stopping (YES at S140), the lower region of the movable mirror 133 is deployed to the space above the dashboard 2 (S230). Therefore, by taking the vehicle traveling safety into consideration, it is possible to appropriately deploy and retract the movable mirror 133.

Moreover, according to the present embodiment, in a state where the movable mirror 133 is retracted in the dashboard 2, the simplified display (also called herein the simplified information screen) is displayed on the effective display region. The simplified display corresponds to a display (called herein the detailed information screen), which is displayed in a state where the retracted lower region of the movable mirror 133 is displayed on the effective display region.

Specifically, part of the information displayed on the detailed information screen is omitted from the simplified information screen. In particular, when the information representing the operating state of the vehicle is displayed as illustrated in FIG. 11, information unimportant for the vehicle traveling safety is preferentially omitted from the simplified information screen to construct the simplified information screen.

Moreover, when the detailed information screen and the simplified information screen display the same kind of information, the kind of graphic representing this information is changed (see FIG. 11) to construct the simplified information screen, so that the vehicle occupant can easily grasp the displayed information.

Moreover, even in cases where the detailed information screen displays the operation object OBJ1, OBJ2, OBJ3, the information screen not including the operation object OBJ1, OBJ2, OBJ3 is displayed as the simplified information screen (see FIGS. 9, 12 and 13), so that when the driving load is large, the manipulation on the information screen is prohibited.

Moreover, according to the present embodiment, the display size and display layout of the information displayed on the effective display region is changed between the detailed information screen and the simplified information screen. Thereby, the display system provides useful information to the vehicle occupant by effectively using the simplified display having the small display area.

Therefore, according to the present embodiment, it is possible to provide the useful information to the vehicle occupant while minimizing the driver's distractions of attention to the front of the vehicle when the driving load is large. The driver's distraction may occur when the driver gazes the information screen.

In the above, the embodiments of the present disclosure are illustrated. However, embodiments of the present disclosure are not limited to the above-illustrated embodiments and can have various forms.

For example, in the display system of the above embodiment, the display screen of the monitor 13A is displayed to the vehicle occupant via the mirror 131, 133. However, in a display system of another embodiment, a display screen of a liquid crystal monitor may be directly displayed to the vehicle occupant without using the mirror.

In the above embodiment, the display system 1 includes the fixed mirror 131. In another embodiment, a display system may not include the fixed mirror 131.

The information screens illustrated in FIGS. 9-13 are merely examples. Information screens having various screen configurations may be adopted.

In the above, the motor 13C of the display device 13 can correspond to an example of actuator. S130 and S150 to S240 performed by the control device 11 can correspond to examples of process performed by a deployment controller and deployment control means. S510 to S530 performed by the control device 11 can correspond to examples of process performed by a display controller and display control means. S110, S120, and S310 to S460 performed by the control device 11 can correspond to examples of process performed by load determination unit and a load determination means. S140 performed by the control device 11 can correspond to an example of process performed by a stop determination unit and a stop determination means.

Embodiments of the present disclosure are not limited the above embodiments and modifications. That is, the above embodiments and modifications thereof may be modified or combined in various ways without departing from the sprit and scope of the present disclosure.

What is claimed is:

1. An information display system mounted in a vehicle, comprising:
    an actuator;
    a display device that includes a display screen for displaying information directed to a vehicle occupant of the vehicle, wherein:
        by being driven by the actuator, the display device retracts a portion of the display screen from a visible space, which is visible to the vehicle occupant, to an invisible space, which is invisible to the vehicle occupant;
        by being driven by the actuator, the display device deploys the retracted portion of the display screen from the invisible space to the visible space; and
        the display device changes a position of the display screen by retracting and deploying the portion of the display screen;
    a deploy controller that controls the position of the display screen by controlling the actuator; and
    a display controller that performs display control of the display device, wherein:
        in accordance with the position of the display screen in the display device, the display controller changes information displayed on an effective display region of the display screen; and
        the effective display region of the display screen is a region disposed in the visible space.

2. The information display system according to claim 1, further comprising:
    a load determination unit that determines whether a driving load on a driver who is driving the vehicle is larger than a threshold,
    wherein:
    when the load determination unit determines that the driving load on the driver is larger than the threshold, the deploy controller controls the actuator to retract the portion of the display screen from the visible space to the invisible space.

3. The information display system according to claim 2, wherein:
    when the load determination unit determines that the driving load on the driver is smaller than or equal to the threshold, the deploy controller controls the actuator to deploy the retracted portion of the display screen from the invisible space to the visible space.

4. The information display system according to claim 2, wherein:
    the load determination unit determines whether or not the driving load on the driver driving the vehicle is larger than the threshold, based on at least one of:
    information representing content of a driving operation of the driver;
    road information around a traveling road of the vehicle; and
    information representing visibility of a front view of the driver.

5. The information display system according to claim 1, further comprising:
    a stop determination unit that determines whether or not the vehicle is stopping,
    wherein:
    when the stop determination unit determines that the vehicle is stopping, the deploy controller controls the actuator to deploy the retracted portion of the display screen from the invisible space to the visible space.

6. The information display system according to claim 1, wherein:
    the display device includes
        a monitor for, displaying the information directed to the vehicle occupant and
        a mirror constituting the display screen, wherein the mirror reflects the information, which is displayed by the monitor, to the vehicle occupant,
    wherein:

by being driven by the actuator, the display device changes the position of the display screen by retracting a portion of the mirror from the visible space to the invisible space and deploying the retracted portion of the mirror from the invisible space to the visible space.

7. The information display system according to claim 1, wherein:
in a state where the portion of the display screen is retracted in the invisible space, the display controller performs the display control to display a simplified display on the effective display region; and
the simplified display corresponds to a non-simplified display, which is displayed on the effective display region in a state where the portion of the display screen is deployed in the visible space.

8. The information display system according to claim 1, wherein:
in a state where the portion of the display screen is retracted in the invisible space, the display controller performs the display control to display simplified information on the effective display region; and
the simplified information is short for non-simplified information, which is displayed on the effective display region in a state where the portion of the display screen is deployed in the visible space.

9. The information display system according to claim 1, wherein:
on the display screen, the display controller displays information representing an operating state of the vehicle as the information directed to the vehicle occupant;
in a state where the portion of the display screen is retracted in the invisible space, the display controller displays simplified information on the effective display region;
the simplified information is short for non-simplified information, which is displayed on the effective display region in a state where the portion of the display screen is deployed in the visible space;
the non-simplified information includes information unimportant for traveling safety of the vehicle; and
the simplified information does not includes at least part of the information unimportant for traveling safety of the vehicle.

10. The information display system according to claim 1, wherein:
the information directed to the vehicle occupant is displayed as a graphic by the display controller; and
the display controller change a kind of the graphic depending on whether the portion of the display screen is retracted in the invisible space or deployed in the visible space.

11. The information display system according to claim 1, wherein:
depending on the position of the display screen, the display controller changes at least one of display size and layout of the information displayed on the effective display region of the display screen.

12. The information display system according to claim 1, wherein:
in a state where the portion of the display screen is retracted in the invisible space, the display controller displays an information window, which does not include an operation object, on the effective display region of the display screen; and
in a state where the portion of the display screen is deployed in the invisible space, the display controller displays another information window, which include the operation object, on the effective display region of the display screen.

13. An information display system for a vehicle, comprising:
a display device that includes a single display screen for displaying information to a vehicle occupant of the vehicle;
an actuator that
retracts a predetermined portion of the single display screen, so that (i) the predetermined portion of the single display screen is disposed inside a dashboard of the vehicle and (ii) the other portion of the single display screen is disposed outside the dashboard, and
deploys the predetermined portion of the single display screen to the outside of the dashboard, so that both of the predetermined portion and the other portion of the single display screen are disposed outside the dashboard;
a deploy controller that controls the actuator to retract and deploy the predetermined portion of the single display screen; and
a display controller that:
makes a deployment retraction determination of whether the predetermined portion of the single display screen is retracted or deployed; and
based on a result of the deployment retraction determination, changes information displayed on an effective display region of the single display screen,
wherein:
the effective display region of the single display screen is defined as a region that is outside the dashboard; and
an area of the effective display region when the predetermined portion of the single display screen is retracted is smaller than that when the predetermined portion of the single display screen is deployed.

* * * * *